United States Patent
Kirsch (10) Patent No.: US 7,386,689 B2
(45) Date of Patent: Jun. 10, 2008

(54) METHOD AND APPARATUS FOR CONNECTING A MASSIVELY PARALLEL PROCESSOR ARRAY TO A MEMORY ARRAY IN A BIT SERIAL MANNER

(75) Inventor: Graham Kirsch, Hants (GB)

(73) Assignee: Micron Technology, Inc., Boise, ID (US)

( * ) Notice: Subject to any disclaimer, the term of this patent is extended or adjusted under 35 U.S.C. 154(b) by 260 days.

(21) Appl. No.: 11/121,172

(22) Filed: May 4, 2005

(65) Prior Publication Data
US 2005/0262288 A1    Nov. 24, 2005

Related U.S. Application Data

(63) Continuation of application No. 09/652,003, filed on Aug. 31, 2000, now Pat. No. 6,912,626.

(51) Int. Cl.
*G06F 12/00* (2006.01)
(52) U.S. Cl. .......................... 711/154; 712/11; 712/14
(58) Field of Classification Search .............. 711/5, 711/101, 104, 105, 154, 165, 170, 173; 712/2, 712/6, 10, 11, 14, 15
See application file for complete search history.

(56) References Cited

U.S. PATENT DOCUMENTS

| | | | |
|---|---|---|---|
| 4,321,694 A | 3/1982 | Panigrahi et al. | |
| 4,380,046 A | 4/1983 | Frosch et al. | |
| 5,038,386 A | 8/1991 | Li | |
| 5,148,547 A | * 9/1992 | Kahle et al. | 712/22 |
| 5,157,785 A | 10/1992 | Jackson et al. | |
| 5,243,699 A | 9/1993 | Nickolls et al. | |
| 5,247,613 A | 9/1993 | Bromley | |
| 5,345,563 A | * 9/1994 | Uihlein et al. | 711/1 |

(Continued)

OTHER PUBLICATIONS

Michael J. Flynn, "Very High-Speed Computing Systems," Proceedings of the IEEE, vol. 54, No. 12, Dec. 1966, pp. 1901-1909.

(Continued)

*Primary Examiner*—Woo H. Choi
(74) *Attorney, Agent, or Firm*—Dickstein Shapiro LLP (57) ABSTRACT

A method and apparatus for connecting the processor array of an MPP array to a memory such that data conversion by software is not necessary, and the data can be directly stored in either a normal mode or vertical mode in the memory is disclosed. A connection circuit is provided in which multiple PEs share their connections to multiple data bits in the memory array. Each PE is associated with a plurality of memory buffer registers, which stores data read from (or to be written to) one or two memory data bits. In horizontal (normal) mode connection the memory bits are selected so that all the bits of a given byte are stored in the same PE, i.e., each set of buffer registers associated with a respective PE contains one byte as seen by an external device. In vertical (bit serial) mode, each set of buffer registers contains the successive bits at successive locations in the memory corresponding to that PEs position in the memory word. The selection is achieved utilizing a multiplexer on the input to the register and a pair of tri-state drivers which drive each data line.

4 Claims, 7 Drawing Sheets

U.S. PATENT DOCUMENTS

| | | | |
|---|---|---|---|
| 5,473,577 A | | 12/1995 | Miyake et al. |
| 5,557,734 A | * | 9/1996 | Wilson ........................ 345/505 |
| 5,579,267 A | | 11/1996 | Koshikawa |
| 5,581,773 A | | 12/1996 | Glover |
| 5,638,533 A | | 6/1997 | Law |
| 5,727,229 A | | 3/1998 | Kan et al. |
| 5,963,746 A | | 10/1999 | Barker et al. |
| 6,061,367 A | | 5/2000 | Siemers |

OTHER PUBLICATIONS

Norman Margolus, "An Embedded DRAM Architecture for Large-Scale Spatial-Lattice Computations," Computer Architecture News Conference, vol. 28, No. 2, May 2000; pp. 149-160.

Fuzion 150 Product Overview, PixelFusion Ltd, PFL/004/99 v2. Revised Jan. 2000.

Gamma II Plus Technical Overview (visited Jul. 2000) <http://www.cppus.com/techoverview.pdf>.

* cited by examiner

| FIG. 5A |
| FIG. 5B |

METHOD AND APPARATUS FOR CONNECTING A MASSIVELY PARALLEL PROCESSOR ARRAY TO A MEMORY ARRAY IN A BIT SERIAL MANNER

This application is a continuation of application Ser. No. 09/652,003, filed Aug. 31, 2000 now U.S. Pat. No. 6,912,626, the subject matter of which is incorporated by reference herein.

BACKGROUND OF THE INVENTION

1. Field of the Invention

The present invention relates to the field of computer memory devices and, more particularly to the connection of a massively parallel processor array to a memory array in a bit serial manner to effect a byte wide data reorganization.

2. Description of the Related Art

Figure 1:
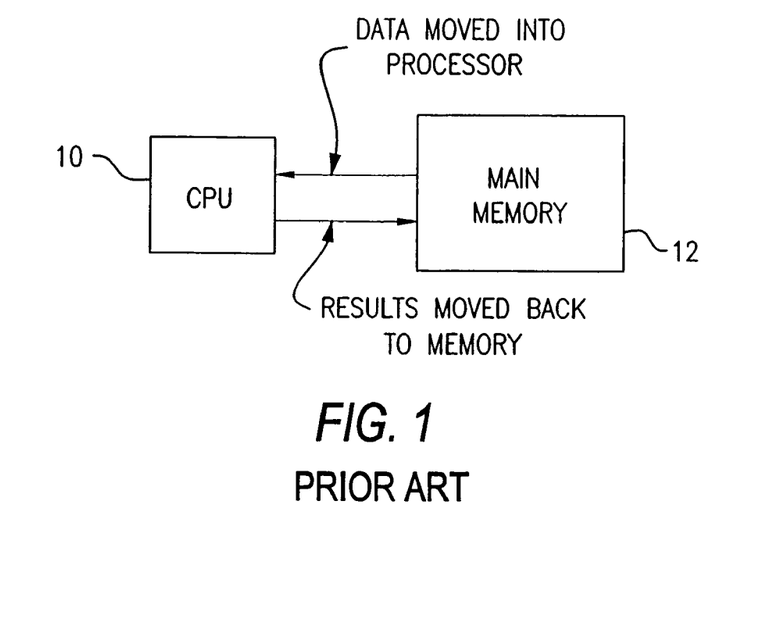
FIG. 1 illustrates in block diagram form a conventional computer architecture.

The fundamental architecture used by all personal computers (PCs) and workstations is generally known as the von Neumann architecture, illustrated in block diagram form in FIG. 1. In the von Neumann architecture, a main central processing unit (CPU) 10 is used to sequence its own operations using a program stored in a memory 12. The memory 12, referred to herein as "main memory", also contains the data on which the CPU 10 operates. In modern computer systems, a hierarchy of cache memories is usually built into the system to reduce the amount of traffic between the CPU 10 and the main memory 12.

The von Neumann approach is adequate for low to medium performance applications, particularly when some system functions can be accelerated by special purpose hardware (e.g., 3D graphics accelerator, digital signal processor (DSP), video encoder or decoder, audio or music processor, etc.). However, the approach of adding accelerator hardware is limited by the bandwidth of the link from the CPU/memory part of the system to the accelerator. The approach may be further limited if the bandwidth is shared by more than one accelerator. Thus, the processing demands of large data sets, such as those commonly associated with large images, are not served well by the von Neumann architecture. Similarly, as the processing becomes more complex and the data larger, the processing demands will not be met even with the conventional accelerator approach.

It should be noted, however, that the von Neumann architecture has some advantages. For example, the architecture contains a homogenous memory structure allowing large memories to be built from many smaller standard units. In addition, because the processing is centralized, it does not matter where the data (or program) resides in the memory. Finally, the linear execution model is easy to control and exploit. Today's operating systems control the allocation of system memory and other resources using these properties. The problem is how to improve processing performance in a conventional operating system environment where multiple applications share and partition the system resources, and in particular, the main memory.

Figure 2:
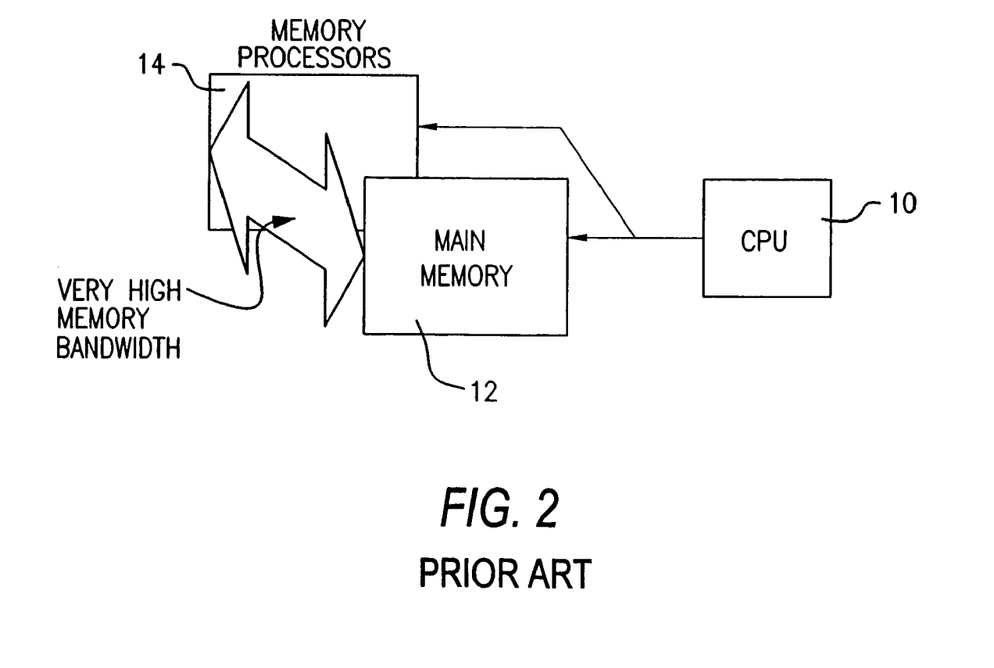
FIG. 2 illustrates in block diagram form the architecture of an active memory.
Figure 3:
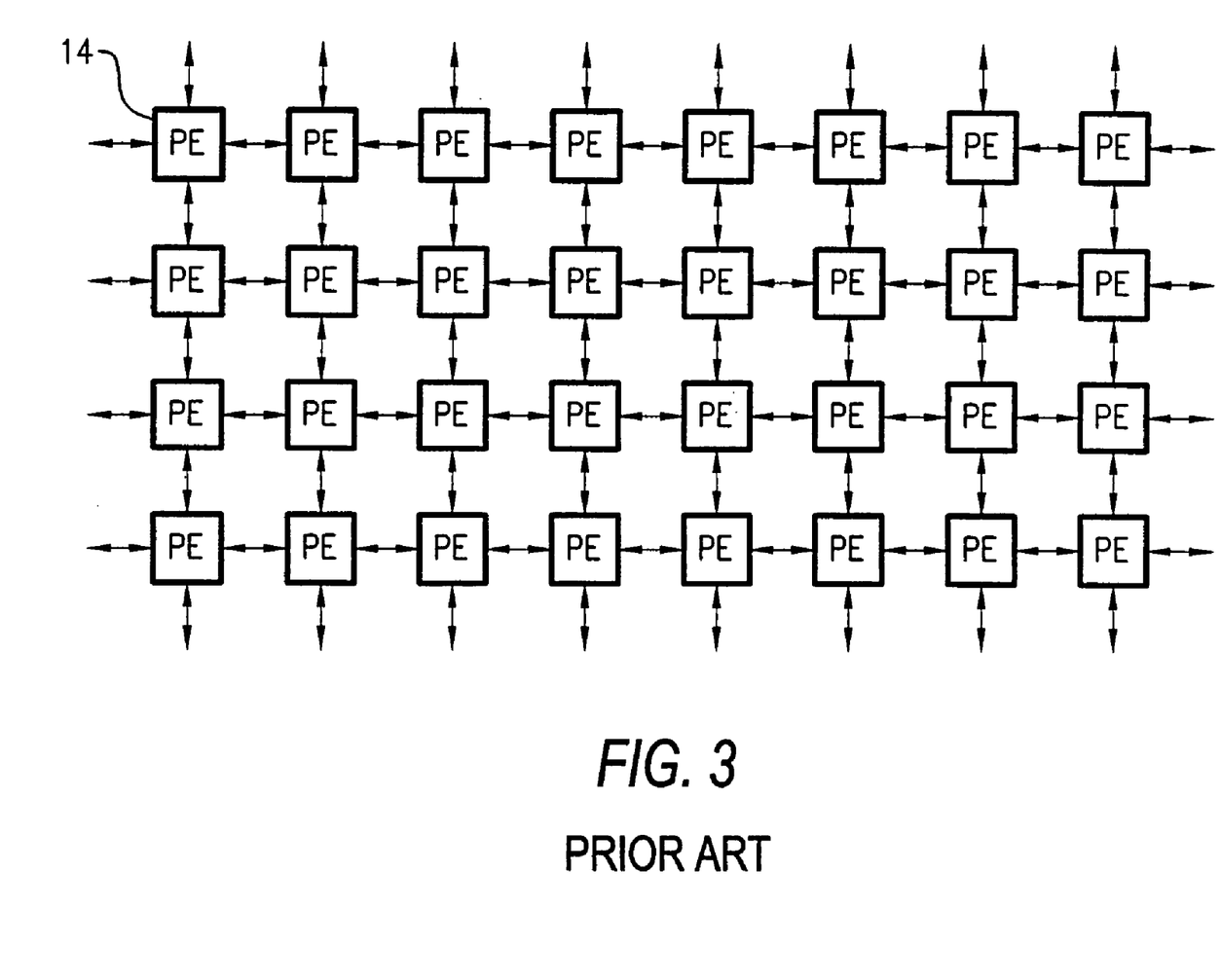
FIG. 3 illustrates in block diagram form a conventional PE interconnect architecture.

One solution is to utilize active memory devices, as illustrated in FIG. 2, in the computer system. Put simply, active memory is memory that can do more than store data; it can process it too. To the CPU 10 the active memory looks normal except that it can be told to do something with the data contents and without the data being transferred to the CPU or another part of the system (via the system bus). This is achieved by distributing processing elements (PEs) in an array 14 through out the memory structure, which can all operate on their own local pieces of memory in parallel. In addition, each PE 16 within the PE array 14 typically communicates with each other, as illustrated in FIG. 3, to exchange data. Thus, active memory encourages a somewhat different view of the computer architecture, i.e., "memory centered" or viewed from the data rather than the processor.

In a computer system having active memory, such as illustrated in FIG. 2, the work of the CPU 10 is reduced to the operating system tasks, such as scheduling processes and allocating system resources and time. Most of the data processing is performed within the memory 12. By having a very large number of connections between the main memory 12 and the processing resources, i.e., the PE array 14, the bandwidth for moving data in and out of memory is greatly increased. A large number of parallel processors can be connected to the memory 12 and can operate on their own area of memory independently. Together these two features can provide very high performance.

There are several different topologies for parallel processors. One example topology is commonly referred to as SIMD (single instruction, multiple data). The SIMD topology contains many processors, all executing the same stream of instructions simultaneously, but on their own (locally stored) data. The active memory approach is typified by SIMD massively parallel processor (MPP) architectures. In the SIMD MPP, a very large number of processors (usually a thousand or more) of relatively simple PEs are closely connected to a memory and organized so that each PE has access to its own piece of memory. All of the PEs execute the same instruction together, but on different data. The instruction stream is generated by a controlling sequencer or processor.

The SIMD MPP has the advantage that the control overheads of the system are kept to a minimum, while maximizing the processing and memory access bandwidths. SIMD MPPs, therefore, have the potential to provide very high performance very efficiently. Moreover, the hardware consists of many fairly simple repeating elements. Since the PEs are quite small in comparison to a reduced instruction set computer (RISC), they are quick to implement into a system design and their benefit with respect to optimization is multiplied by the number of processing elements. In addition, because the PEs are simple, it is possible to clock them fast and without resorting to deep pipelines.

Figure 4:
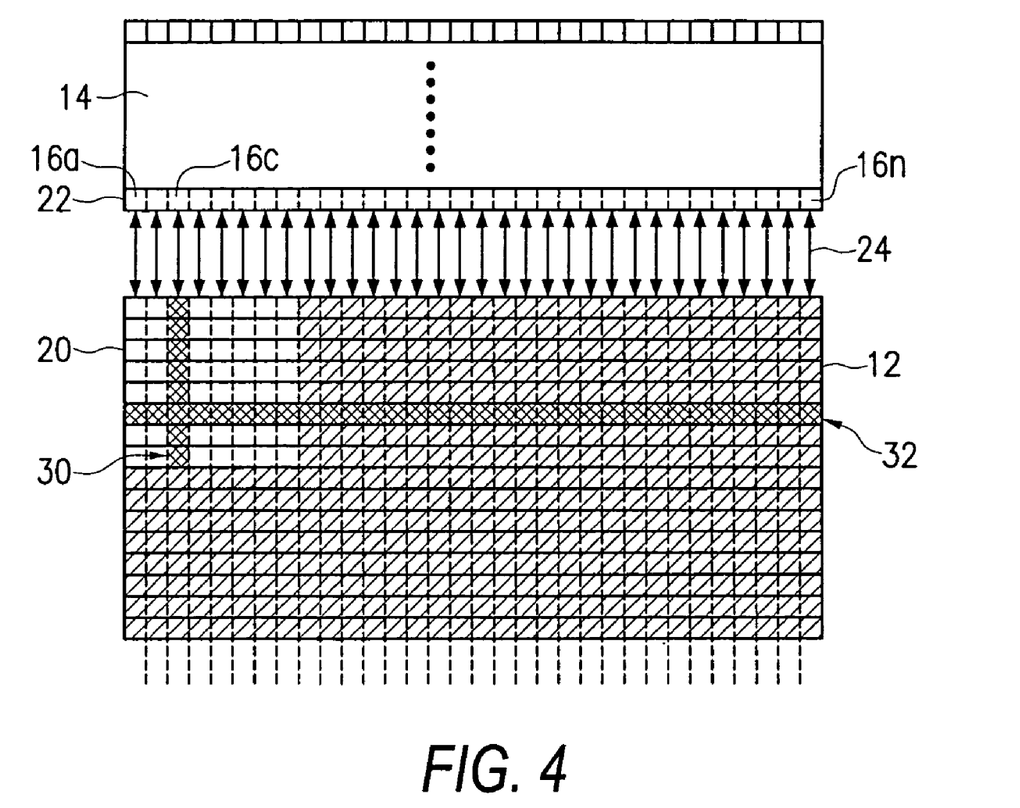
FIG. 4 illustrates vertical and horizontal data storage in a memory.

In one exemplary massively parallel processor array, each PE 16 in the PE array 14 uses only a single pin to connect to the memory 12. Thus, a one bit wide data connection is provided. When this is done, data is stored "bit serially" so that successive bits of a binary value are stored at successive locations in the memory 12. This storage format is referred to as "vertical" storage. Thus data read from and written to each PE will be read and stored, respectively, "vertically" in successive locations in the memory 12 as illustrated in FIG. 4. Thus, in FIG. 4, if each PE 16a-16n in a row 22 of PE array 14 is an eight bit PE, i.e., it operates on eight bits of data at a time, the data in the memory will be stored in eight successive vertical locations as illustrated. As noted above, each PE is connected to memory 12 by a one bit wide data connection 24. Thus, data from PE 16c will be stored in a byte sized area 20 of memory 12 in successive locations in area 20, i.e., it will be stored vertically as illustrated by arrow 30. The storage of data bit serially has a number of benefits. First, the number of data wires per PE 16 to the memory 12 is kept to a minimum. Second, it allows for variable precision arithmetic to be more easily and efficiently implemented. For example, ten, twelve, or fourteen bit numbers can be stored and processed efficiently. Third, in some cases, the difference in speed of the memory access versus the PE cycle time can be matched by serializing the data access.

There are some drawbacks, however, with storing the data from the PE array 14 bit serially. For example, in most applications, a chip containing a SIMD MPP array 14 and its associated memory 12 will have some form of off-chip interface which allows an external device, such as for example CPU 10 as illustrated in FIG. 2, to access the on-chip memory 12. CPU 10 sees data stored word-wide, i.e., "horizontally" as illustrated by arrow 32 in FIG. 4, referred to as normal mode. Thus, for external devices to access data stored vertically requires that the data be reorganized, i.e., converted, to the normal mode before being transferred from the memory to the external device, or converted by the external memory device before it can be used.

Converting between the two formats, i.e., normal and vertical, can be performed within the PE array 14 or within the external device that needs access to the data, but it would be more efficient to store the data in a single format, thus avoiding having to store it in one format and convert it to another. Preferably, the single format would be the normal format used by the external devices.

Thus, there exists a need for a connection between a PE array and main memory in a MPP such that software data conversion is not required, and data can be stored in a normal mode or vertical mode in the memory.

SUMMARY OF THE INVENTION

The present invention provides a method and apparatus for connecting the processor array of an MPP array to a memory such that data conversion by software is not necessary, and the data can be directly stored in either a normal mode or vertical mode in the memory.

The above and other features and advantages of the invention are achieved by a connection circuit in which multiple PEs share their connections to multiple data bits in the memory array. Each PE is associated with a plurality of memory buffer registers, which stores data read from (or to be written to) one or two memory data bits. In horizontal (normal) mode connection the memory bits are selected so that all the bits of a given byte are stored in the same PE, i.e., each set of buffer registers associated with a respective PE contains one byte as seen by an external device. In vertical (bit serial) mode, each set of buffer registers contains the successive bits at successive locations in the memory corresponding to that PEs position in the memory word. The selection is achieved utilizing a multiplexer on the input to the register and a pair of tri-state drivers which drive each data line.

These and other advantages and features of the invention will become more readily apparent from the following detailed description of the invention which is provided in connection with the accompanying drawings.

DETAILED DESCRIPTION OF PREFERRED EMBODIMENTS

The present invention will be described as set forth in the exemplary embodiments illustrated in FIGS. 5-7. Other embodiments may be utilized and structural or logical changes may be made without departing from the spirit or scope of the present invention. Like items are referred to by like reference numerals.

In accordance with the present invention, a method and apparatus for connecting the processor array of an MPP to the memory such that data conversion by software is not necessary, and the data can be directly stored in either a normal mode or vertical mode in the memory is provided.

Figures 5, 5A:
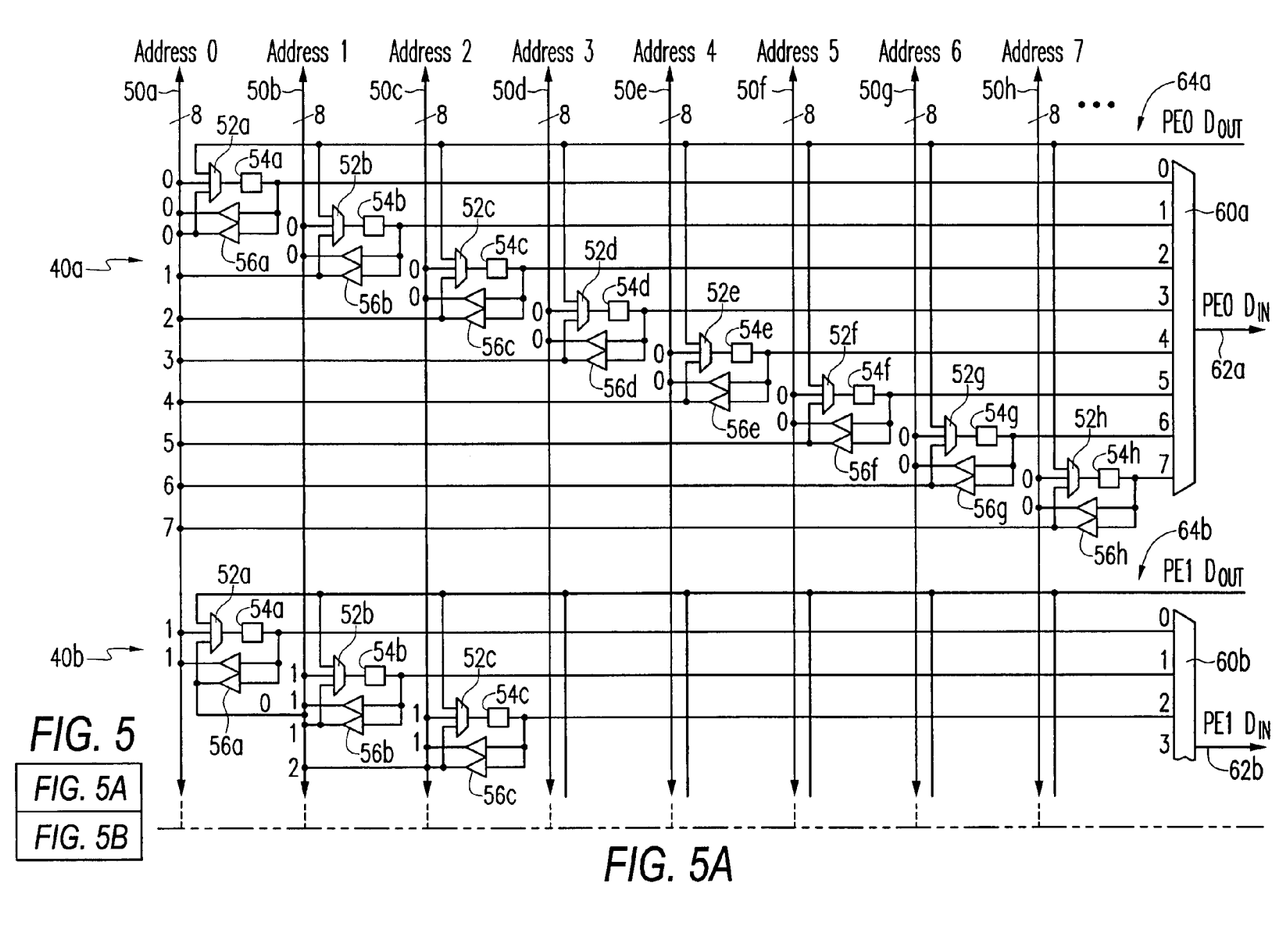
FIG. 5 illustrates in schematic diagram form a connection between a PE array and a memory in accordance with the present invention.
Figures 5, 5B:
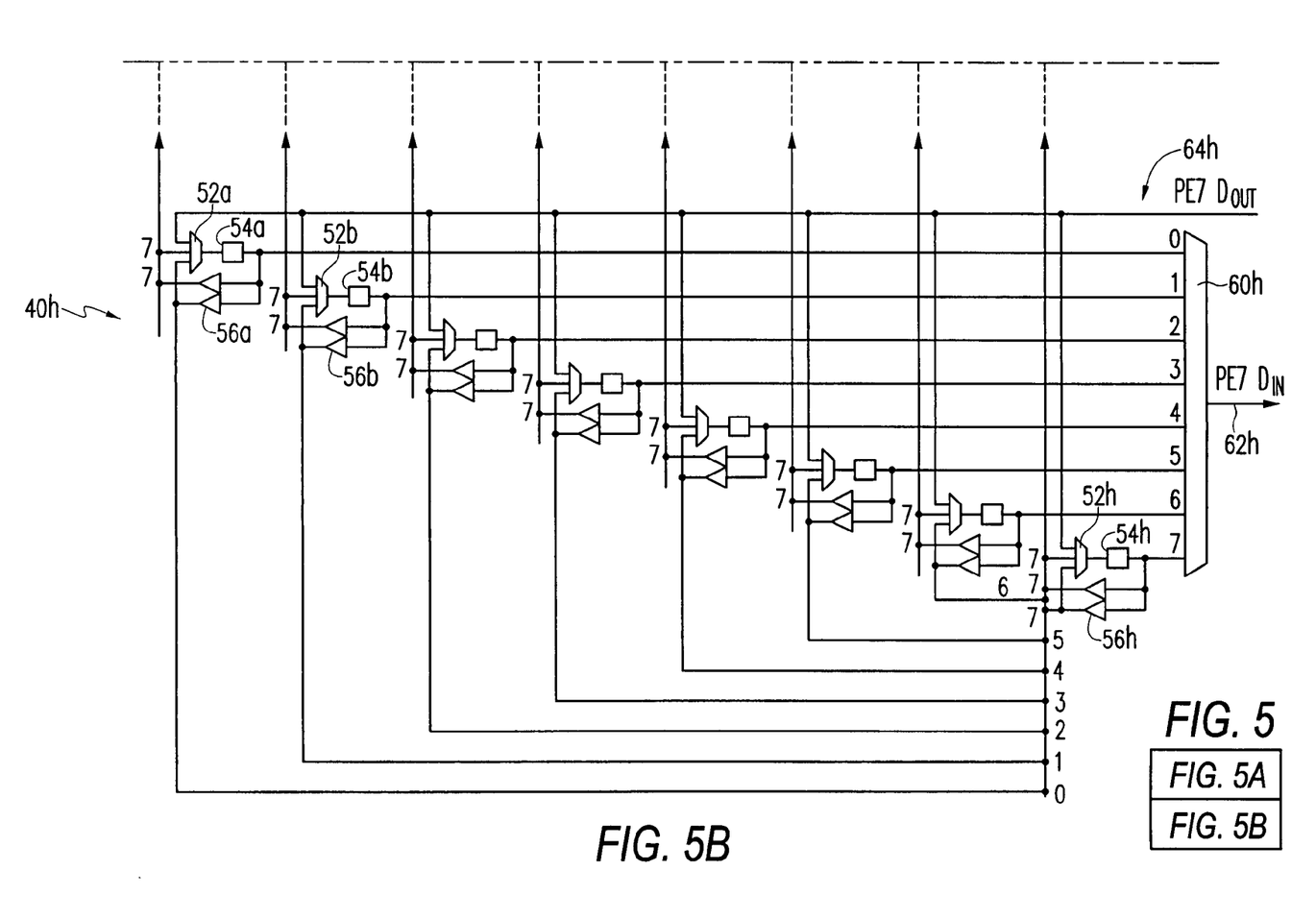
Figure 6:
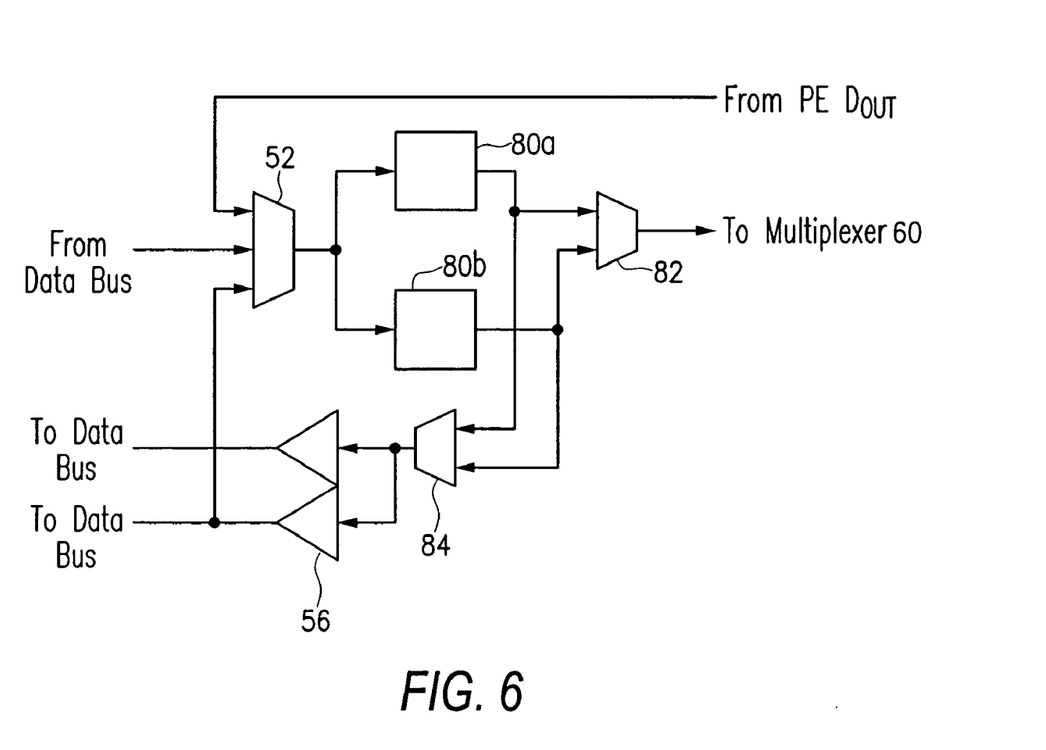
FIG. 6 illustrates in schematic diagram form an alternative embodiment for the connection between the PE array and memory of FIG. 5.

FIG. 5 illustrates the connection of a processor array of an MPP to a memory in accordance with the present invention. In accordance with the present invention, eight eight-bit PEs PE0-PE7 share their connections to 64 data bits in the memory array. A connection circuit 40a-40h is associated with each PE, i.e., PE0 to PE7, respectively. As illustrated in FIG. 5, each address Address0-Address7 from the memory, such as for example memory 12 of FIG. 2, is an eight bit address, each having an associated eight bit data line bus 50a-50h. While the description of FIG. 5 is with respect to eight-bit PEs and eight bit data buses, it should be understood that the invention is not so limited and the invention is applicable to any data width, such as for example, ten bit, twelve bits fourteen bits, etc.

As shown in FIG. 5, each data bit line of data bus 50a-50h is connected to a second input of a respective multiplexer 52a-52h in each circuit 40a-40h associated with each PE PE0-PE7. Thus, the data bit line for the first bit of data, i.e., Bit0, is connected to the second input of multiplexers 52a-52h in the circuit 40a associated with PE0, the data bit line for the second bit of data, i.e., Bit1, is connected to the second input of multiplexers 52a-52h in the circuit 40b associated with PE1, and so on up to the data bit line for the last bit of data, i.e., Bit7, which is connected to the second input of multiplexers 52a-52h in the circuit 40h associated with PE7.

Referring back to the circuit 40a associated with PE0 in FIG. 5, the output from each multiplexer 52a-52h is connected to a respective buffer register 54a-54h. The output from each buffer register 54a-54h is connected to a respective input <0>-<7> of an eight-input multiplexer 60a. The output from each buffer register 54a-54h is also connected to the input of a respective pair of tri-state drivers 56a-56h. The output PE0 Din 62a from multiplexer 60 is connected to the first PE in the group of eight, i.e., PE0, by a single bit connection for passing data from the memory, i.e., Address0-Address7, to PE0. A second data line, PE Dout 64a, is also connected to the single bit connection to receive data from PE0 for writing to the memory into addresses Address0-Address7. The data line PE Dout 64a is connected to a first input of each multiplexer 52a-52h.

The output from the first and second tri-state drivers in pair 56a is connected to a respective bit data line of data bus 50a, i.e., the data bit line associated with the first bit of data Bit0 in Address0. In addition, the output from the second tri-state driver in pair 56*a* is connected to a third input of multiplexer 52*a*. The output from the first tri-state driver in pair 56*b* is connected to a respective data bit line of data bus 50*b*, i.e., the data bit line associated with the first bit of data Bit0 in Address1, while the output from the second tri-state driver of pair 56*b* is connected to the second data bit line of data bus 50*a* and a third input of multiplexer 52*b*. The outputs from the remaining pairs of tri-state drivers 56*c*-56*h* are similarly connected, i.e., the output from the first tri-state driver of each pair 56*c*-56*h* is connected to its associated bit data line for the first bit of data Bit0 of data bus 50*c*-50*h*, while the output from the second tri-state driver of each pair 56*c*-56*h* is connected to a third input of its respective multiplexer 52*c*-52*h* and also connected to respective bit data lines of data bus 50*a*.

The above circuit 40*a* is substantially duplicated for each of the remaining circuits 40*b*-40*h* for each of the PEs in the group, i.e., PE1-PE7, with the following exception. For the circuit 40*b* associated with PE1, the output from the first and second tri-state drivers in pair 56*b* is connected to a respective bit data line of data bus 50*b*, i.e., the bit data line associated with the second bit of data Bit1 from Address1, while the remaining pairs of tri-state drivers 56*a* and 56*c*-56*h* each have the output from the first tri-state driver connected to the bit data line associated with the second bit of data Bit1 of its associated data bus 50*a* and 50*c*-50*h*, respectively, and the output from the second tri-state driver is connected to respective bit data lines of data bus 50*b* and the third input of its respective multiplexer 52*a* and 52*c*-52*h*. For the circuit associated with PE2 (not shown), the output from the first and second tri-state drivers in pair 56*c* is connected to the bit data line associated with the third bit of data Bit2 of data bus 50*c*, while the remaining pairs of tri-state drivers 56*a*, 56*b* and 56*d*-56*h* each have the output from the first tri-state driver connected to the data bit line associated with the third bit of data Bit2 of its associated data bus 50*a*, 50*b* and 50*d*-50*h*, respectively, and the output from the second tri-state driver is connected to a respective bit data line of data bus 50*c* and the third input to its respective multiplexer 52*a*, 52*b* and 52*d*-52*h*. This continues to the circuit 40*h* associated with the last PE in the group of eight PEs, i.e., PE7, where the output from the first and second tri-state drivers in pair 56*h* is connected to the data bit line associated with the last bit of data Bit7 in Address7 of data bus 50*h*, while the remaining pairs of tri-state drivers 56*a*-56*g* each have the output from the first tri-state driver connected to the data bit line associated with the last bit Bit7 of its associated data bus 50*a*-50*g*, respectively, and the output from the second tri-state driver is connected to a respective bit data line of data bus 50*h* and the third input to its respective multiplexer 52*a*-52*g*.

The operation of the circuitry as illustrated in FIG. 5 is as follows. Suppose for example a read of data is desired, and the data is stored in the memory in a vertical mode, i.e., data will be read from the memory 12 in a vertical fashion, as illustrated in FIG. 4, to each PE. Thus, it is desired to input each bit from a respective bit in Address0 to Address7 into a respective PE. For example, the first bit, i.e., Bit0, from each address Address0 to Address7 will be input to PE0, the second bit, i.e., Bit1, from each address Address0 to Address7 will be input to PE1, and so on up to the last bit, i.e., Bit7, from each address Address0 to Address7 which will be input to PE7. As the data is output on the data buses 50*a*-50*h*, each multiplexer 52*a*-52*h* will pass the data on its second input, i.e., data from the respective data buses 50*a*-50*h*, to its respective register 54*a*-54*h*. Thus, in circuit 40*a*, the first bit of data, i.e., Bit0, will be passed through multiplexers 52*a*-52*h* to registers 54*a*-54*h*, and then to multiplexer 60*a*. Multiplexer 60*a* will in turn send each bit of data Bit0 serially, i.e., from input <0> to input <7>, to PE0 via output 62*a*. Thus the output from multiplexer 60*a* to PE0 will be Bit0 from each of addresses Address0-Address7 i a serial manner.

Similarly, in circuit 40*b*, the second bit of data, i.e., Bit1, will be passed through multiplexers 52*a*-52*h* to registers 54*a*-54*h*, and then to multiplexer 60*b*. Multiplexer 60*ba* will in turn send each bit of data serially, i.e., from input <0> to input <7>, to PE1 via output 62*b*. The circuits associated with each remaining PE will operate similarly, up to circuit 40*h*, where the last bit of data, i.e., Bit7, will be passed through multiplexers 52*a*-52*h* to registers 54*a*-54*h*, and then to multiplexer 60*h*. Multiplexer 60*h* will in turn send each bit data serially, i.e., from input <0> to input <7>, to PE7 via output 62*h*. Accordingly, the data is provided to each PE from the memory addresses Address0-Address7 in a vertical fashion.

Now suppose for example, a read is desired in which the data is stored in a horizontal mode in the memory, i.e., data stored in the memory in a normal mode (horizontal mode) as illustrated in FIG. 4, will be read from the memory and input to the respective PEs. Thus, each data bit from Address0 must be input to PE0 in a serial fashion from Bit0 to Bit7, each data bit from Address1 must be input to PE1 in a serial fashion from Bit0 to Bit7, and so forth. Referring to circuit 40*a*, as the data Bit0 to Bit7 from Address0 is provided on bus 50*a*, Bit0 on data bit line 0 of bus 50*a* will be input to the third input of multiplexer 52*a*, Bit1 on data bit line 1 of bus 50*a* will be input to the third input of multiplexer 52*b*, Bit2 on data bit line 2 of bus 50*a* will be input to the third input of multiplexer 52*c*, and so forth up to Bit7 on data bit line 7 of bus 50*a* which will be input to the third input of multiplexer 52*h*. Multiplexers 52*a*-52*h* will pass the input on its third input to the respective registers 54*a*-54*h*. The data in registers 54*a*-54*h* will be sent to multiplexer 60*a*. Multiplexer 60*a* will in turn send each bit of data serially, i.e., from input <0> to input <7>, to PE0 via output 62*a*. Thus, PE0 will receive Bit0 to Bit7 from Address0 a single bit at a time.

Similarly, in circuit 40*b*, as the data Bit0 to Bit7 from Address1 is provided on bus 50*b*, Bit0 on data bit line 0 of bus 50*b* will be input to the third input of multiplexer 52*a*, Bit1 on data bit line 1 of bus 50*b* will be input to the third input of multiplexer 52*b*, Bit2 on data bit line 2 of bus 50*b* will be input to the third input of multiplexer 52*c*, and so forth up to Bit7 on data bit line 7 of bus 50*b* which will be input to the third input of multiplexer 52*h*. Multiplexers 52*a*-52*h* will pass the input on its third input to the respective registers 54*a*-54*h*. The data in registers 54*a*-54*h* will be sent to multiplexer 60*b*. Multiplexer 60*b* will in turn send each bit of data serially, i.e., from input <0> to input <7>, to PE1 via output 62*b*. Thus, PE1 will receive Bit0 to Bit7 from Address1 a single bit at a time.

The circuits associated with each remaining PE will operate similarly, up to circuit 40*h*, where as the data Bit0 to Bit7 from Address7 is provided on bus 50*h*, Bit0 on data bit line 0 of bus 50*h* will be input to the third input of multiplexer 52*a*, Bit1 on data bit line 1 of bus 50*h* will be input to the third input of multiplexer 52*b*, Bit2 on data bit line 2 of bus 50*h* will be input to the third input of multiplexer 52*c*, and so forth up to Bit7 on data bit line 7 of bus 50*h* which will be input to the third input of multiplexer 52*h*. Multiplexers 52*a*-52*h* will pass the input on its third input to the respective registers 54*a*-54*h*. The data in registers 54a-54h will be sent to multiplexer 60h. Multiplexer 60h will in turn send each bit of data serially, i.e., from input <0> to input <7>, to PE7 via output 62h. Thus, PE7 will receive Bit0 to Bit7 from Address7 a single bit at a time. Accordingly, the data can be read from the memory in a horizontal mode.

Now suppose for example a write is desired in which the data from each PE will be stored in the memory in a vertical mode as illustrated in FIG. 4. Thus, it is desired to enter each of the eight bits from a PE into the same location in respective memory addresses Address0-Address7. Referring to circuit 40a of FIG. 5, the data will be serially output from PE0 on line PE Dout 64, which is connected to the first input of each multiplexer 52a-52h. The first bit of data output from PE0 will be passed by multiplexer 52a to register 54a, and then to the pair of tri-state drivers 56a. The first tri-state driver of pair 56a will pass the data to data bit line 0 of data bus 50a, which will write the data into the first bit Bit0 of Address 0. Similarly, the second bit of data output from PE0 will be passed by multiplexer 52b to register 54b, and then to the input of the pair of tri-state drivers 56b. The first tri-state driver of pair 56b will pass the data to data bit line 0 of data bus 50b, which will write the data into the first bit Bit0 of Address1. This continues for each bit of data from PE0, up to the last bit which is passed by multiplexer 52h to register 54h, and then to the input the pair of tri-state drivers 56h. The first tri-state driver of pair 56h will pass the data to data bit line 0 of data bus 50h, which will write the data into the first bit Bit0 of Address7.

The remaining circuits 40b-40h operate similarly to store the data into the respective location of each address Address0-Address7. For example, with respect to circuit 40b, the first bit of data output from PE1 will be passed by multiplexer 52a to register 54a, and then to the input of the pair or tri-state drivers 56a. The first tri-state driver of pair 56a will pass the data to data bit line 1 of data bus 50a, which will write the data into the second bit Bit1 of Address 0. Similarly, the second bit of data output from PE1 will be passed by multiplexer 52b to register 54b, and then to the input of the pair of tri-state drivers 56b. The first tri-state driver of pair 56b will pass the data to data bit line 1 of data bus 50b, which will write the data into the second bit Bit1 of Address1. This process continues for each bit of data from PE1 until the second data bit Bit1 of each address Address0-Address7 is filled.

Referring now to circuit 40h, the first bit of data output from PE7 will be passed by multiplexer 52a to register 54a, and then to the input of the pair of tri-state drivers 56a. The first tri-state driver of pair 56a will pass the data to data bit line 7 of data bus 50a, which will write the data into the last bit Bit7 of Address 0. Similarly, the second bit of data output from PE7 will be passed by multiplexer 52b to register 54b, and then to the input of the pair of tri-state drivers 56b. The first tri-state driver of pair 56b will pass the data to data bit line 7 of data bus 50b, which will write the data into the last bit Bit7 of Address1. This process continues for each bit of data from PE7 until the last data bit Bit7 of each address Address0-Address7 is filled. Thus, data can be written from each PE to the memory in a vertical mode.

Now suppose for example a write is desired in which the data from each PE will be stored in the memory in a normal mode (horizontal mode) as illustrated in FIG. 4. Thus, it is desired to enter each of the eight bits from a PE sequentially into the respective bits of same address location. Referring to circuit 40a of FIG. 5, the data will be serially output from PE0 on line PE Dout 64, which is connected to the first input of each multiplexer 52a-52h. The first bit of data output from PE0 will be passed by multiplexer 52a to register 54a, and then to the input of the pair of tri-state drivers 56a. The second tri-state driver of pair 56a will pass the data to data bit line 0 of data bus 50a, which will write the data into the first bit Bit0 of Address 0. Similarly, the second bit of data output from PE0 will be passed by multiplexer 52b to register 54b, and then to the input of the pair of tri-state drivers 56b. The second tri-state driver of pair 56b will pass the data to data bit line 1 of data bus 50a, which will write the data into the second bit Bit1 of Address0. This continues for each bit of data from PE0, up to the last bit which is passed by multiplexer 52h to register 54h, and then to the input of the pair of tri-state drivers 56h. The second tri-state driver of pair 56h will pass the data to data bit line 7 of data bus 50a, which will write the data into the last bit Bit7 of Address0. Thus, the eight bits of data from PE0 will be written into Bit0 to Bit7 of Address0.

The remaining circuits 40b-40h operate similarly to store the data into the successive locations of each address Address1-Address7. For example, with respect to circuit 40b, the first bit of data output from PE1 will be passed by multiplexer 52a to register 54a, and then to the input of the pair of tri-state drivers 56a. The second tri-state driver of pair 56a will pass the data to data bit line 0 of data bus 50b, which will write the data into the first bit Bit0 of Address1. Similarly, the second bit of data output from PE1 will be passed by multiplexer 52b to register 54b, and then to the input of the pair of tri-state drivers 56b. The second tri-state driver of pair 56b will pass the data to data bit line 1 of data bus 50b, which will write the data into the second bit Bit1 of Address1. This process continues for each bit of data from PE1 until the last bit of data from PE1 is written to Bit7 of Address1.

Referring now to circuit 40h, the first bit of data output from PE7 will be passed by multiplexer 52a to register 54a, and then to the input of the pair of tri-state drivers 56a. The second tri-state driver of pair 56a will pass the data to data bit line 0 of data bus 50h, which will write the data into the first bit Bit0 of Address7. Similarly, the second bit of data output from PE7 will be passed by multiplexer 52b to register 54b, and then to the input of the pair of tri-state drivers 56b. The second tri-state driver of pair 56b will pass the data to data bit line 1 of data bus 50h, which will write the data into the second bit Bit1 of Address7. This process continues for each bit of data from PE7 until the last data bit Bit7 is written to the last bit Bit7 of Address7. Thus, data can be written to the memory in a horizontal mode.

Thus, in accordance with the present invention, data can be read from a memory to a PE and written to the memory from the PE via a single bit connection in either a vertical or horizontal mode.

The use of a single register 52, such as for example 52a-52h, for each circuit 40a-40h allows only one byte to be held per PE in the memory buffer for either a read or a write operation. The use of a second register would allow write data to be held in one while the other is used for a read, or for data pipelining to be done for either. FIG. 6 illustrates in schematic diagram form an alternative embodiment of FIG. 5, in which each register 54a-54h of FIG. 5 is replaced by a pair of registers 80a and 80b. Accordingly, the output from a respective multiplexer 52, i.e., multiplexers 52a-52h of circuits 40a-40h of FIG. 5, is input to register 80a and register 80b. The output, from each register 80a and 80b is input to a multiplexer 82. The output of multiplexer 82 is sent to a respective multiplexer 60, i.e., multiplexer 60a-60h of FIG. 5. Additionally, the output from registers 80a and 80b is input to a second multiplexer 84, whose output is connected to a respective pair of tri-state drivers 56, i.e., tri-state drivers 56a-56h of FIG. 5. The operation of the circuit as illustrated in FIG. 6 is similar to that as described with respect to FIG. 5, except that multiplexers 82 and 84 are used to determine from which register 80a or 80b data will be passed to either the input of tri-state driver pair 56 or multiplexer 60. Accordingly, the use of two registers 80a, 80b allows write data to be held in one while the other is used for a read, or for data pipelining to be done for either register.

Figure 7:
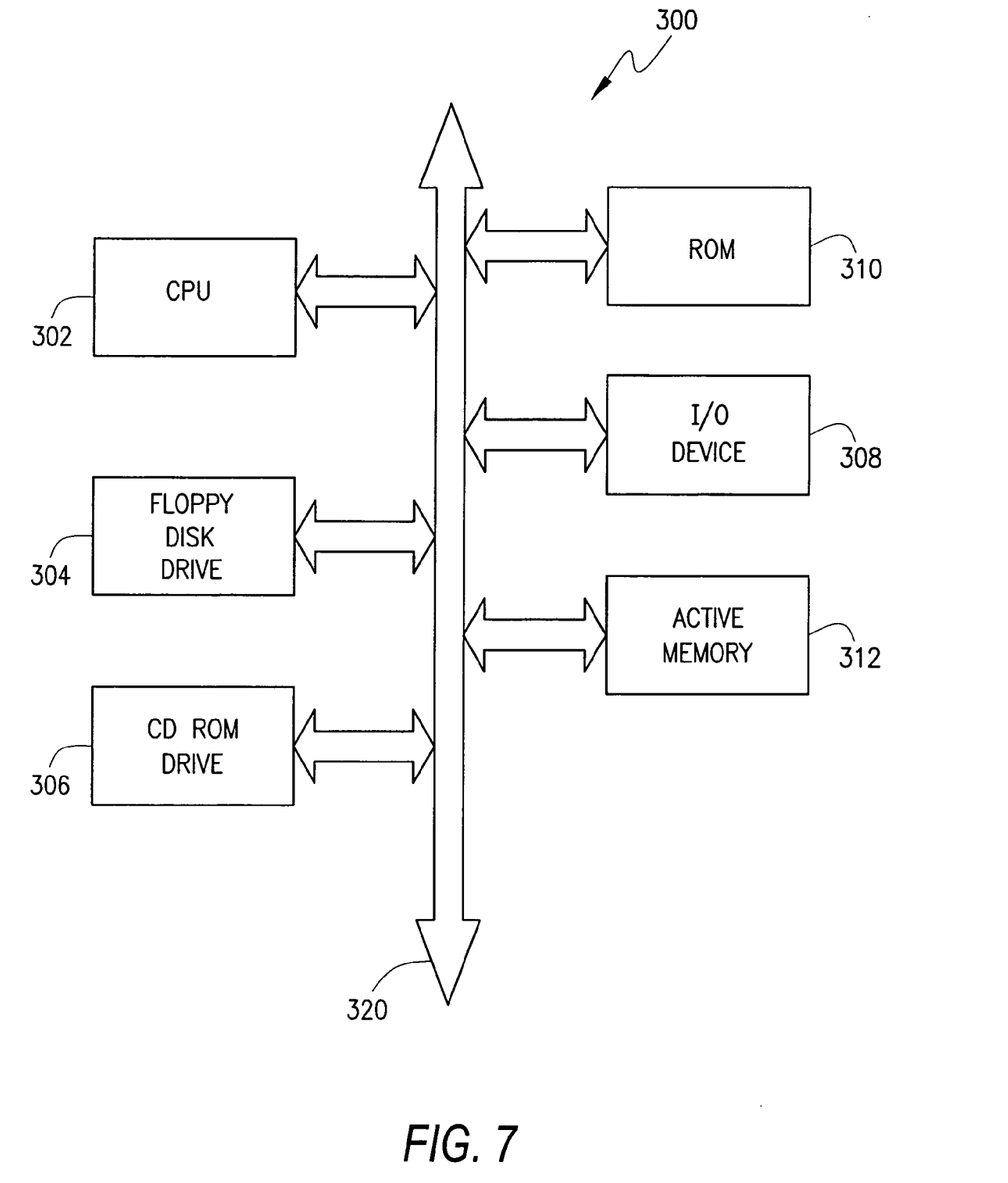
FIG. 7 illustrates in block diagram form a processor based system in which the present invention may be employed.

An active memory device having the connection circuits 40a-40h of the present invention may be used in a processor-based system 300 of the type shown in FIG. 7. The processor-based system 300 comprises a processor 302 that communicates with the memory device 312 and an I/O device 308 over a bus 320. It must be noted that the bus 320 may be a series of buses and bridges commonly used in a processor-based system, but for convenience purposes only, the bus 320 has been illustrated as a single bus. The memory device 312 includes connection circuits 40a-40h as previously described with respect to FIGS. 5 and 6. The memory device 312 may be a SIMD MPP or any other type of DRAM or SRAM utilizing multiple PEs. In addition, the processor 302 may itself be an integrated processor which utilizes on-chip memory devices containing the circuitry of the present invention.

The processor-based system 300 may be a computer system, a process control system or any other system employing a processor and associated memory. The processor-based system 300 may also include read-only memory (ROM) 310 and may include peripheral devices such as a floppy disk drive 304 and a compact disk (CD) ROM drive 306 that also communicate with the processor 302 over the bus 320 as is well known in the art.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. An active memory device comprising:
a main memory;
a plurality of processing elements, each of said plurality of processing elements being associated with a respective portion of said main memory, each of said plurality of processing elements having a single bit data output and a single bit data input; and
a plurality of data path circuits, each of said plurality of data path circuits being coupled between said main memory and one of said plurality of processing elements, each of said plurality of data path circuits having a plurality of inputs, a first input of said plurality of inputs being coupled to said single bit output of a respective one of said plurality of processing elements, at least a second input of said plurality of inputs being coupled to a respective one of a plurality of data buses of said main memory, and an output coupled to said single bit input of a respective one of said plurality of processing elements,
wherein each of said data path circuits is adapted to receive data from said respective one of said plurality of processing elements a single bit at a time and write said data to said main memory in a horizontal mode, and to receive data stored in said main memory in a horizontal mode and output said data to said respective one of said plurality of processing elements a single bit at a time,
wherein each of said data path circuits is further adapted to write data from said plurality of processing elements to said main memory in a vertical mode and read data stored in said main memory in a vertical mode from said main memory to said plurality of processing elements, and wherein each of said plurality of data path circuits further comprises:
a first multiplexer having a plurality of inputs, each of said plurality of inputs being coupled to an output of a respective one of a plurality of logic circuits, and an output coupled to said output of said data path circuit; and wherein each of said plurality of logic circuits comprises:
a first input, said first input being coupled to said at least a second input of said plurality of inputs of said data path circuit;
an output;
a second multiplexer having a first input coupled to said first input of said data path circuit and a second input coupled to said input of said logic circuit;
a first register having an input coupled to an output of said second multiplexer and an output coupled to said output of said logic circuit;
a first tri-state device having an input coupled to said output of said first register and an output coupled to said respective one of said plurality of data buses; and
a second tri-state device having an input coupled to said output of said first register and an output coupled to one of said plurality of data buses and a third input of said second multiplexer.

2. The active memory device of claim 1, wherein said output of said second tri-state device is coupled to said respective one of said plurality of data buses.

3. An active memory device comprising:
a main memory;
a plurality of processing elements, each of said plurality of processing elements being associated with a respective portion of said main memory, each of said plurality of processing elements having a single bit data output and a single bit data input; and
a plurality of data path circuits, each of said plurality of data path circuits being coupled between said main memory and one of said plurality of processing elements, each of said plurality of data path circuits having a plurality of inputs, a first input of said plurality of inputs being coupled to said single bit output of a respective one of said plurality of processing elements, at least a second input of said plurality of inputs being coupled to a respective one of a plurality of data buses of said main memory, and an output coupled to said single bit input of a respective one of said plurality of processing elements,
wherein each of said data path circuits is adapted to receive data from said respective one of said plurality of processing elements a single bit at a time and write said data to said main memory in a horizontal mode, and to receive data stored in said main memory in a horizontal mode and output said data to said respective one of said plurality of processing elements a single bit at a time, wherein each of said data path circuits is further adapted to write data from said plurality of processing elements to said main memory in a vertical mode and read data stored in said main memory in a vertical mode from said main memory to said plurality of processing elements, and each of said plurality of data path circuits comprising:

a plurality of inputs, a first input of said plurality of inputs being coupled to said single bit output of a respective one of said plurality of processing elements, at least a second input of said plurality of inputs being coupled to a respective one of a plurality of data buses of said main memory, and an output coupled to said single bit input of a respective one of said plurality of processing elements;

a first multiplexer having a plurality of first multiplexer inputs, each of said plurality of first multiplexer inputs being coupled to an output of a respective one of a plurality of logic circuits, and an output coupled to said output of said data path circuit; and wherein each of said plurality of logic circuits comprises:

a first input, said first input being coupled to said at least a second input of said plurality of inputs of said data path circuit;

an output;

a second multiplexer having a first input coupled to said first input of said data path circuit and a second input coupled to said input of said logic circuit;

a first register having an input coupled to an output of said second multiplexer and an output;

a second register having an input coupled to said output of said second multiplexer and an output;

a third multiplexer having a first input coupled to said output of said first register, a second input coupled to said output of said second register, and an output coupled to said output of said logic circuit;

a fourth multiplexer having a first input coupled to said output of said first register, a second input coupled to said output of said second register, and an output;

a first tri-state device having an input coupled to said output of said fourth multiplexer and an output coupled to said respective one of said plurality of data buses; and a second tri-state device having an input coupled to said output of said fourth multiplexer and an output coupled to one of said plurality of data buses and a third input of said second multiplexer.

4. The active memory device of claim 3, wherein said output of said second tri-state device is coupled to said respective one of said plurality of data buses.

* * * * *